United States Patent
Bruch et al.

(10) Patent No.: US 9,281,507 B2
(45) Date of Patent: Mar. 8, 2016

(54) BATTERY HAVING FEED-THROUGH ASSEMBLY FORMING COMPRESSION JOINT WITH INSULATION LAYER AND METHOD FOR MAKING THE SAME

(71) Applicant: Pacesetter, Inc., Sunnyvale, CA (US)

(72) Inventors: Russell Bruch, Greenville, SC (US); Joseph Beauvais, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 338 days.

(21) Appl. No.: 13/838,421

(22) Filed: Mar. 15, 2013

(65) Prior Publication Data

US 2014/0272544 A1 Sep. 18, 2014

(51) Int. Cl.
| | |
|---|---|
| *H01M 2/04* | (2006.01) |
| *H01M 2/06* | (2006.01) |
| *H01M 2/08* | (2006.01) |
| *H01M 2/30* | (2006.01) |
| *H01M 2/32* | (2006.01) |
| *H01M 2/34* | (2006.01) |
| *H01M 2/10* | (2006.01) |

(52) U.S. Cl.
CPC .......... *H01M 2/1094* (2013.01); *H01M 2/0404* (2013.01); *H01M 2/06* (2013.01); *Y10T 29/49108* (2015.01)

(58) Field of Classification Search
CPC ... H01M 2/1094; H01M 2/0404; H01M 2/06; Y10T 29/49108
USPC .......................................... 429/163; 29/623.1
See application file for complete search history.

(56) References Cited

U.S. PATENT DOCUMENTS

| | | | |
|---|---|---|---|
| 3,956,576 A * | 5/1976 | Jensen et al. ............... | 174/138 F |
| 5,643,694 A * | 7/1997 | Heller, Jr. ..................... | 429/181 |
| 2004/0258988 A1* | 12/2004 | Nielsen et al. ................ | 429/181 |
| 2006/0166078 A1* | 7/2006 | Chen et al. ...................... | 429/62 |

* cited by examiner

*Primary Examiner* — Sean P Cullen
(74) *Attorney, Agent, or Firm* — Theresa A. Raymer

(57) ABSTRACT

A battery includes a case having a lid. A feed-through assembly provides an electrical connection through the lid. Feed-through insulation is disposed over the feed-through assembly. An insulation layer is disposed over the inner surface of the lid and the feed-through assembly. The insulation layer comprises an aperture configured to accommodate the feed-through assembly and to form a compression joint with the feed-through insulation disposed over the feed-through assembly.

20 Claims, 8 Drawing Sheets

Top View

Cross-section

BATTERY HAVING FEED-THROUGH ASSEMBLY FORMING COMPRESSION JOINT WITH INSULATION LAYER AND METHOD FOR MAKING THE SAME

BACKGROUND

1. Technical Field

The disclosure relates to an electrical component such as a battery having improved feed-through insulation and methods of manufacturing same.

2. Related Art

Batteries are commonplace in a wide variety of electrical applications. Improvements in battery life and failure rate are constantly being sought in order to achieve better longevity and performance. This is particularly true in implantable medical devices (IMD's) such as implantable cardioverter defibrillators (ICD's) where a long-lasting, failure free battery is critical.

Lithium batteries are commonly used in ICD's. For examples of such batteries, see U.S. Pat. No. 5,744,261 to Muffoletto et al. and U.S. Pat. No. 5,458,997 to Crespi et al. Cluster formation is a major failure mode in lithium batteries. For instance, lithium clusters (i.e., a steady growth of lithium crystals) can form between cathode and anode surfaces of the battery. Because lithium is a conductor, cluster formation can result in a short circuit when a cluster connects (i.e., forms a bridge between) a cathode surface and an anode surface. Such a short circuit can have severe implications to battery life and to its functionality. While cluster formation mechanisms are not well understood, insulation of the anode surfaces from the cathode surfaces is known to reduce cluster formation and to therefore mitigate early battery depletion and/or failure due to a short caused by a cluster.

Current ICD battery insulation schemes are designed to prevent physical contact between anode and cathode surfaces due to battery swelling, manufacturing variations, or mechanical disturbances such as vibration. However, these insulation schemes fail to adequately protect from cluster formations growing around the insulators and creating shorts. Accordingly, there is a need in the art for improved schemes and methods of insulation that better protect from cluster formation.

Additionally a number of known insulation schemes rely heavily on the use of adhesives, which increase the complexity and expense of battery manufacture. Furthermore, due to variability in the manufacturing process, the use of adhesives can introduce additional failure points in the insulation. Accordingly, there is also a need in the art for improved schemes and methods of insulation that reduce or eliminate the need for adhesives.

BRIEF SUMMARY

According to various embodiments a method of manufacturing an electrical component such as a battery is provided. According to the method, a feed-through insulation is disposed on a feed-through assembly. The feed-through insulation may comprise any suitable insulation such as a thermoplastic (e.g., polypropylene (PP), polyether ether ketone (PEEK), polyethylene (PE), and the like), which may be disposed using injection molding. The feed-through assembly can then be mounted to a battery case on, in one embodiment, a lid of the case. An insulation layer is disposed over the feed-through on an inner surface of the case (e.g., on the inner surface of the lid). The insulation layer comprises an aperture (e.g., a circular hole or an opening formed or cut in the insulation layer) that has a diameter smaller than the feed-through assembly with the feed-through insulation disposed thereon, such that the insulation layer forms a compression joint with the feed through insulation disposed over the feed-through assembly.

According to embodiments, an electrical component such as a battery is provided. The electrical component includes a case that forms an internal compartment and has an opening to provide access to an internal compartment. The case includes a lid to close the opening. A first aperture (e.g., an opening or hole) is formed or cut in the case, for example, in the lid). A feed-through assembly is disposed in the first aperture. Feed-through insulation is disposed over the feed-through assembly at, for example, an inward-facing side of the lid. An insulation layer is disposed over an inner surface of the lid and the feed-through assembly. According to various embodiments, the insulation layer includes a second aperture that has a diameter smaller than the feed-through assembly with the feed-through insulation disposed thereon. The insulation layer is disposed on the lid such that it forms a compression joint with the feed-through insulation disposed over the feed-through assembly.

BRIEF DESCRIPTION OF THE DRAWINGS/FIGURES

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention. Additionally, the left most digit(s) of a reference number identifies the drawing in which the reference number first appears.

Figure 1:
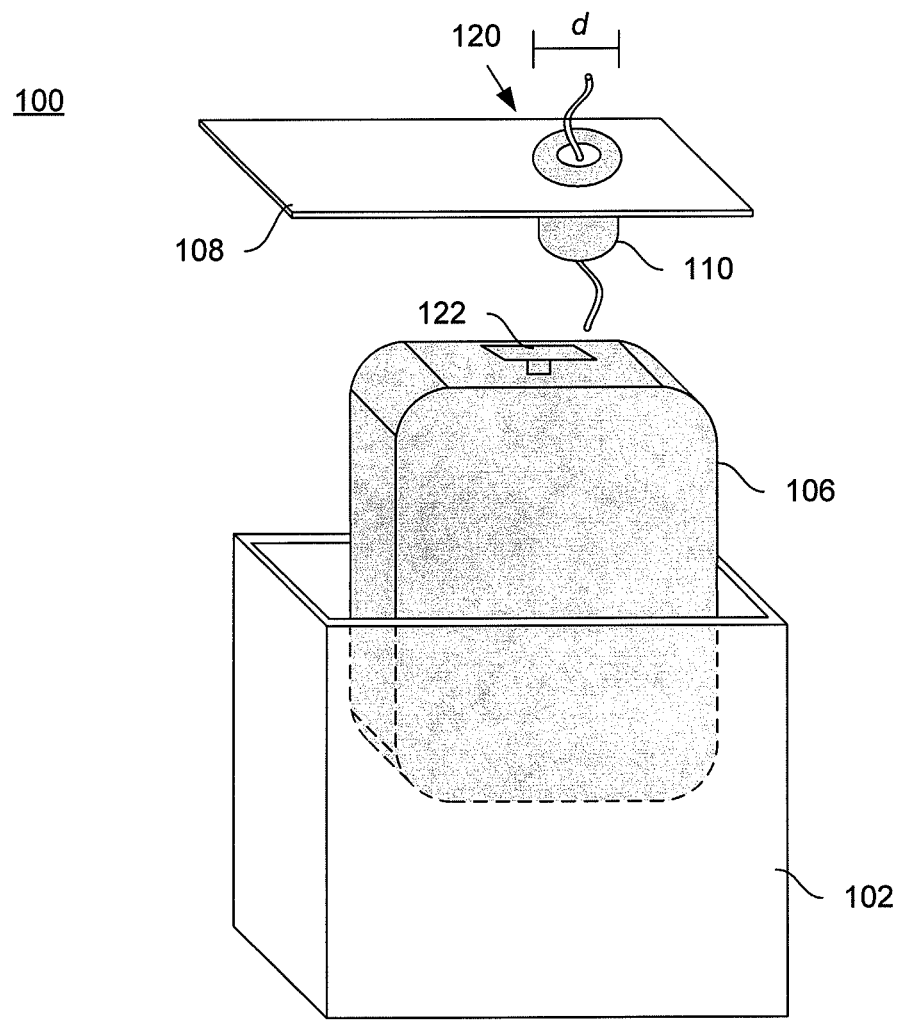
FIG. 1 depicts a battery assembly according to various embodiments of the disclosure.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many battery and/or capacitor structures and manufacturing methods without departing from the spirit and scope of the present disclosure.

FIG. 1 depicts an exploded view of a battery assembly 100 according to various embodiments of the disclosure. As shown, the battery assembly 100 includes a case 102, a power cell 106 and a lid portion 108. Lid portion 108 (also referred to herein as "lid 108") is part of case 102. According to various embodiments, case 102 is constructed from an electrically conducting material and is electrically coupled to an anode of a power cell 106. In this example embodiment, power cell 106 comprises a stack of interleaved anode plates and cathode plates and may further contain, for instance, a cathode connector or bus 122 that is electrically connected to cathode portion of the battery.

The lid 108 of the case 102 contains a substantially circular aperture (e.g., a hole or opening) 120 that has a diameter d. According to various embodiments, the aperture 120 has a large enough diameter to accommodate a feed-through assembly 110. The diameter d of the aperture 120 can be closely matched to (e.g., the same as or slightly smaller than) the diameter of a feed-through 112 (described below) of the feed-through assembly 110. This allows feed-through 112 to be pressed into aperture 120 to form a secure connection between feed-through 112 and lid 108, without requiring the use of an adhesive to secure feed-through 112 in aperture 120.

Figure 2:
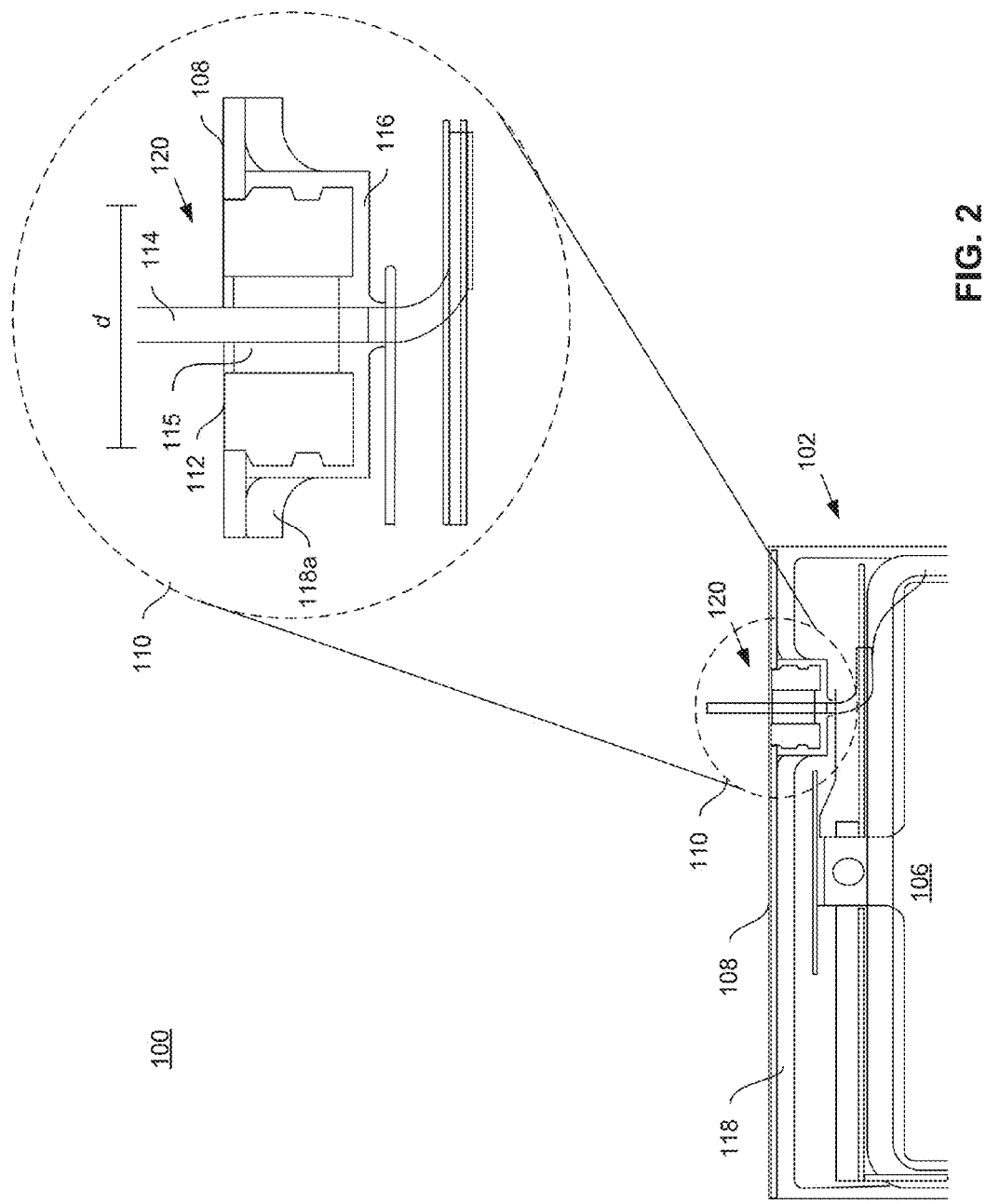
FIG. 2 depicts a cross-section of a battery assembly according to an embodiment of the disclosure.

FIG. 2 is a cross-sectional view of a portion of battery assembly 100 and depicts a more detailed view with an expanded feed-through assembly 110. In this example embodiment, the feed-through assembly 110 includes feed-through 112 having a central opening (i.e., a lumen) to accommodate a feed-through conductor 114, which is configured to be connected to the cathode of the power cell 106. The feed-through 112 and the feed-through conductor 114 are electrically isolated from one another using a variety of known techniques including filler insulation and a feed-through insulator 116. Feed-through insulator 116 (i.e., first insulation layer) is disposed on the body of feed-through 112 as shown in FIG. 2. The feed-through insulator 116 may comprise any suitable insulator such as a thermoplastic polymer (e.g., polypropylene (PP), polyether ether ketone (PEEK), polyethylene (PE), and the like).

An insulation layer 118 (i.e., second insulation layer) is disposed on the inside of case 102. According to various embodiments, the insulation layer 118 is formed from an insulating material (e.g., ethylene tetrafluoroethylene (ETFE), polyether ether ketone (PEEK), or the like) that has a high corrosion resistance and is suitable to withstand an electrolyte inside the battery. According to embodiments, the insulation layer 118 can be disposed on the inner surface of case 102 using a vacuum forming process. Insulation layer 118 includes an aperture 404 (e.g., a hole or opening) (not labeled in FIG. 2, see FIG. 4D) to accommodate the feed-through assembly 110. In an embodiment, insulation layer 118 includes a first portion vacuum-formed on the inner surface of the case 102 and a second portion vacuum-formed on the inner surface of lid 108.

As shown in FIG. 2, the diameter of aperture 404 of the insulation layer 118 is slightly smaller than the diameter of the feed-through assembly 110. This creates an interference fit between the insulation layer 118 and the feed-through insulator 116. Accordingly, when the insulation layer 118 is disposed over the feed-through assembly 110, a portion or overlap region 118a of the insulation layer 118 flexes and engages with the feed-through insulator 116 over the feed-through assembly 110. The overlap region 118a of the insulation layer 118 creates a continuous seal around the periphery of feed-through insulator 116 that is robust and will survive abuse testing well. This solution also advantageously eliminates the need for adhesives, which has the effect of making the manufacturing process simpler, less expensive, and reducing possible failure points.

Figure 3:
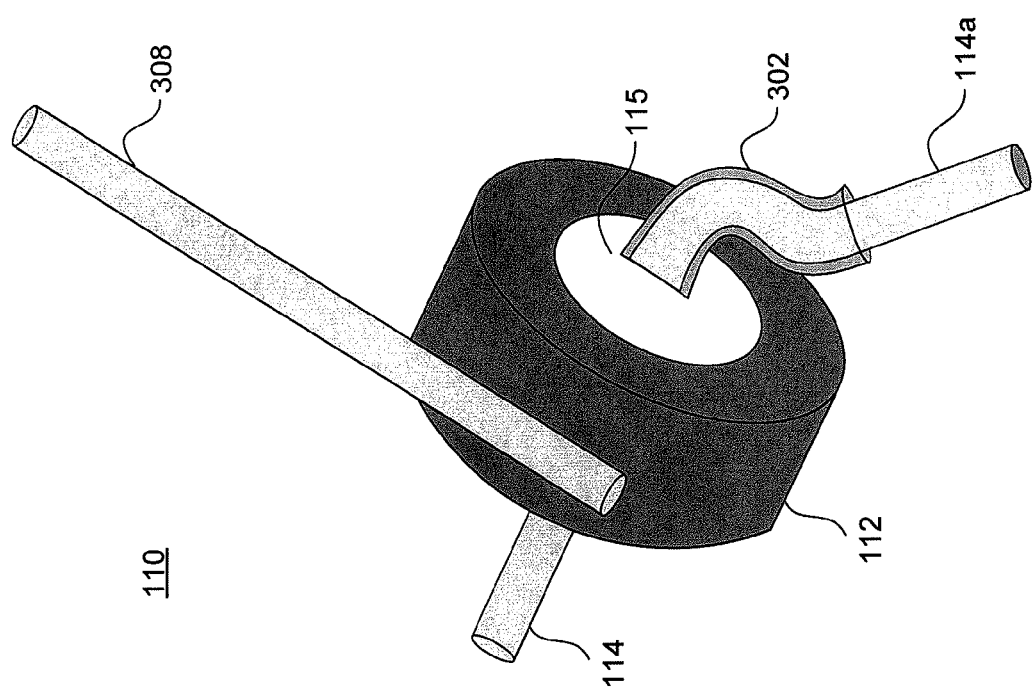
FIG. 3 depicts a feed-through assembly for use in a battery assembly according to an embodiment of the disclosure.

FIG. 3 is a detailed depiction of a feed-through assembly 110 according to various embodiments. The feed-through assembly may comprise a feed-through 112 that has an opening to allow a feed-through conductor 114 to pass through. The feed-through 112 is depicted as having a cylindrical shape in FIG. 2. A person skilled in the relevant art, however, will understand that any suitable shape could be used for the feed-through (and the corresponding apertures with which it must mate) and that the invention is not limited to a cylindrical shape. Because, in some embodiments, the feed-through 112 may be electrically coupled to an anode of a battery cell (e.g., power cell 106) and the feed-through conductor 114 can be electrically coupled to the cathode of a battery cell (e.g., power cell 106), it is important to electrically isolate the feed-through 112 from the feed-through conductor 114.

According to various embodiments, the feed-through conductor 114 can be insulated using an insulating tube 302. The insulating tube 302 may be constructed of any appropriate insulating material such as plastic, glass, or a combination thereof. For instance, the insulating tube 302 may be primarily comprised of plastic, but a glass seal might be formed at the termination of the plastic portion to create a fully sealed joint. Filler insulation 115 may be applied to further seal the feed-through assembly 110. The filler insulation 115 may comprise any suitable insulating material such as epoxy or silicone.

The feed-though 112 may be electrically coupled to the anode of a battery cell 106 via anode conductor 308 (or through direct contact with the lid 108 of case 102 via the fit formed when feed-through 120 is press fit into aperture 120 of lid 108). The feed-through conductor 114 may be electrically coupled to a cathode of the battery cell 106. Insulating tube 302 may terminate near where the feed-through conductor 114 meets the cathode bus (not shown) of the battery cell at 114*a*.

Figure 4A:
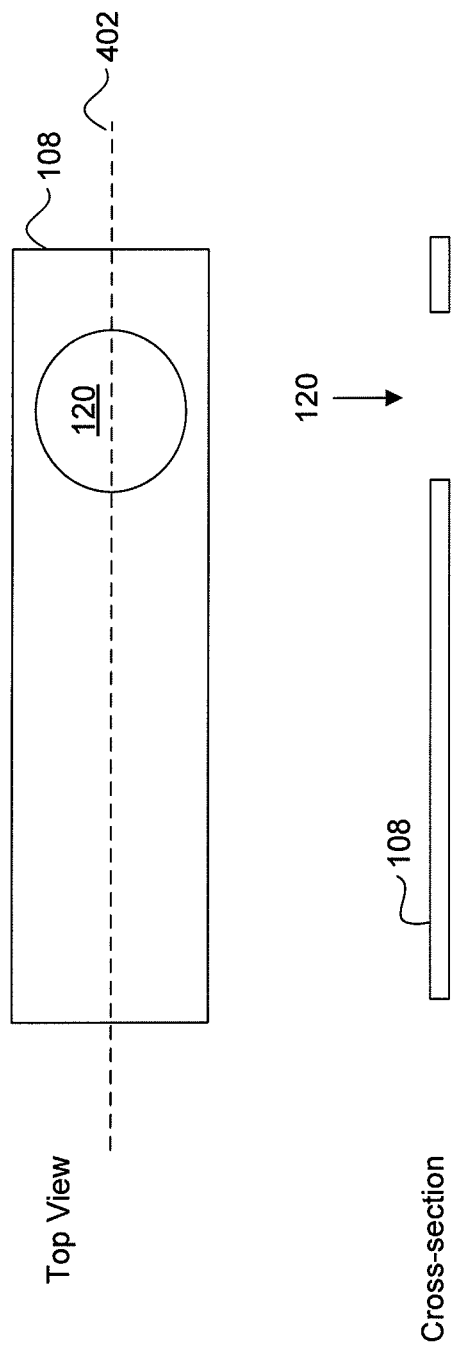
FIGS. 4A-4D depict a portion of the battery assembly at different stages during the manufacturing process according to an embodiment of the disclosure.

FIGS. 4A-4D depict a portion of a battery assembly 100 at various stages during its manufacture according to various embodiments. FIG. 4A depicts lid 108 of the battery assembly 100 from two different perspectives: a top view perpendicular to the face of lid 108 and a cross-sectional view along cross section line 402. As shown in FIG. 4A, the lid 108 contains aperture 120 configured to accommodate a feed-through assembly. According to some embodiments, the lid 108 along with the remainder of case 102 may be constructed from a conducting material such as stainless steel.

Figure 4B:
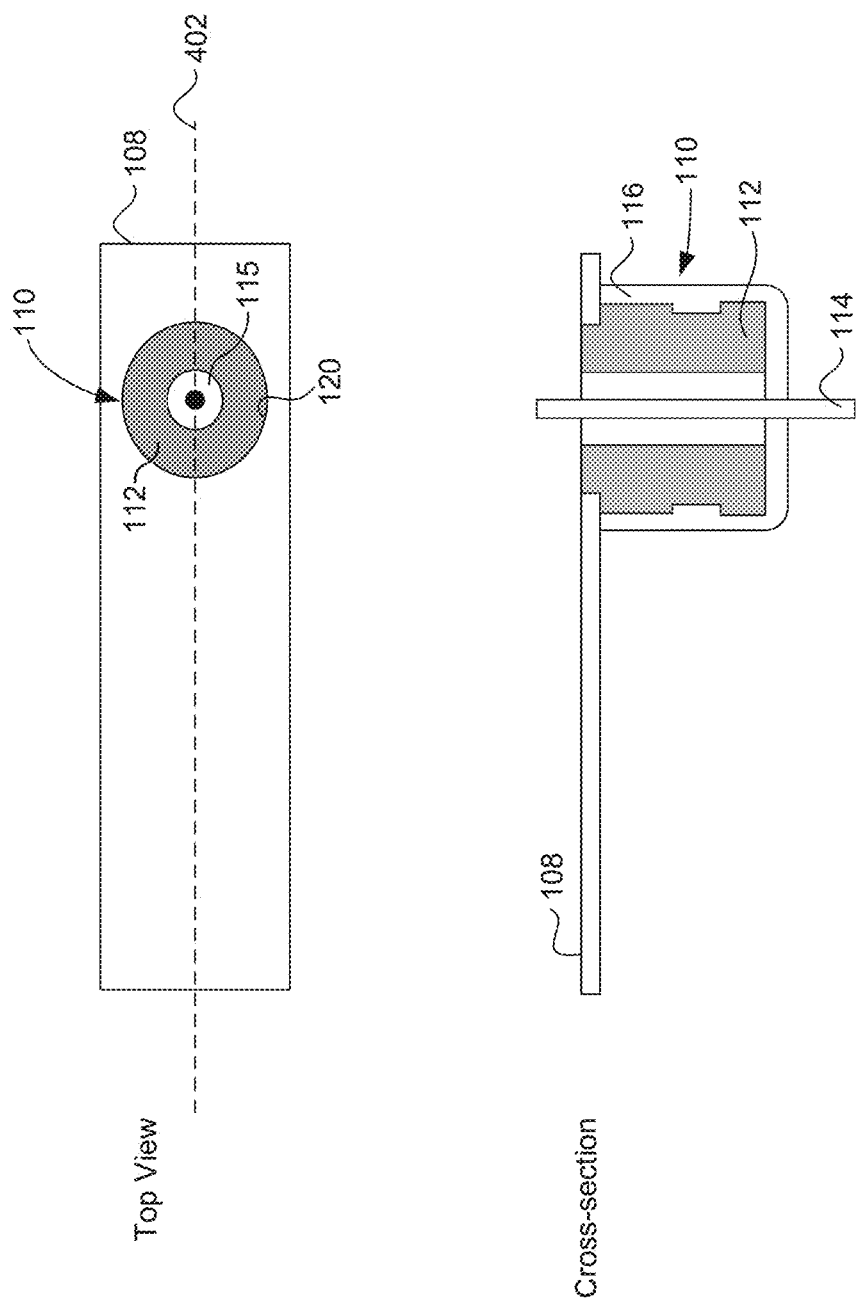

FIG. 4B depicts a portion of the battery assembly 100 after a feed-through assembly 110 has been fixed in the aperture 120. As shown, the feed-through assembly 110 has a diameter that is substantially similar to the diameter of aperture 120. According to some embodiments, the diameter of the feed-through assembly 110 at the point where it contacts the aperture 120 is closely matched to (e.g., the same as or slightly larger than) the diameter of the aperture 120 in order to facilitate attaching the feed-through assembly 110 to the lid 108 using a press fit.

Figure 4C:
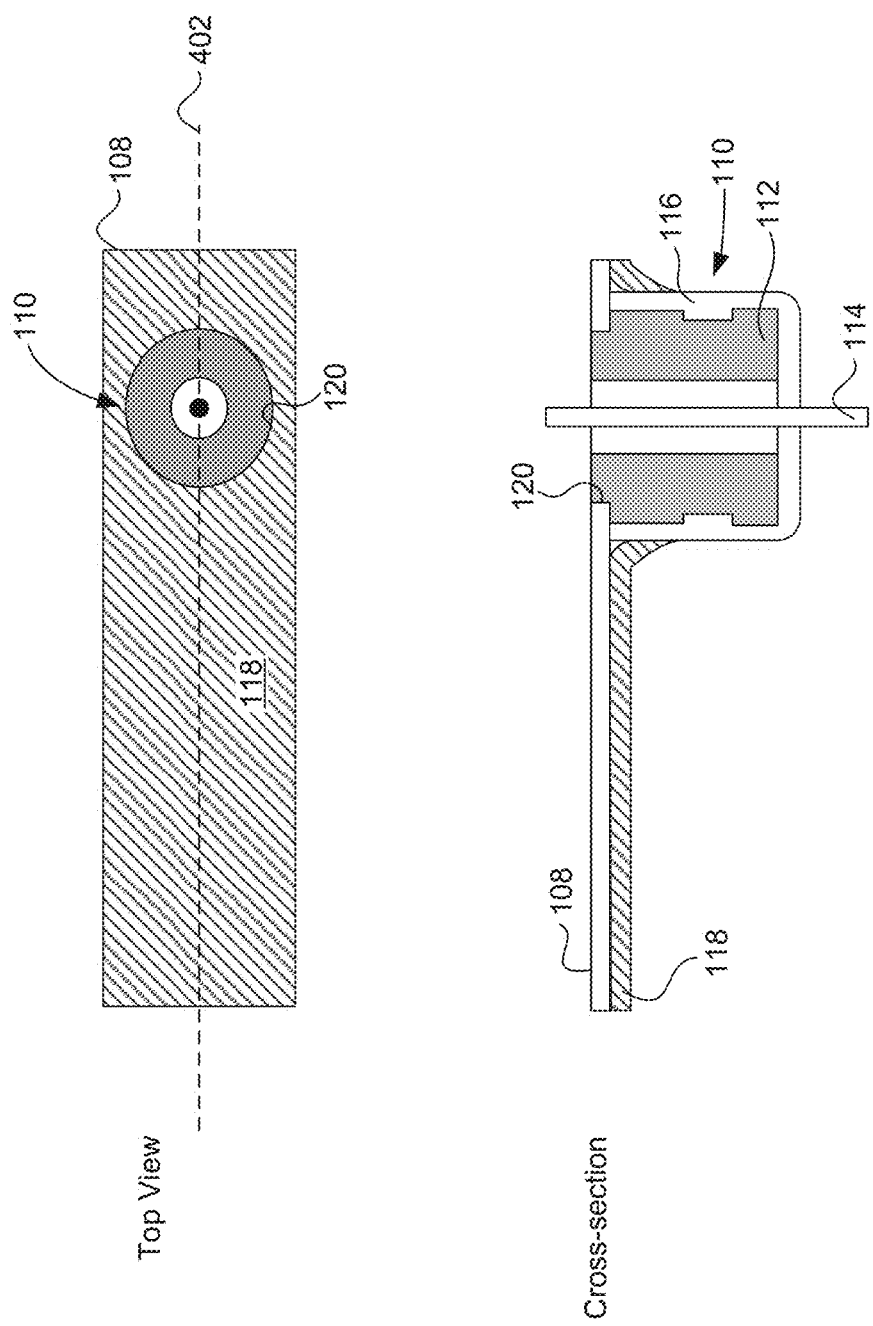

FIG. 4C depicts a portion of the battery assembly 100 after an insulation layer 118 has been disposed over the lid 108.

Figure 4D:
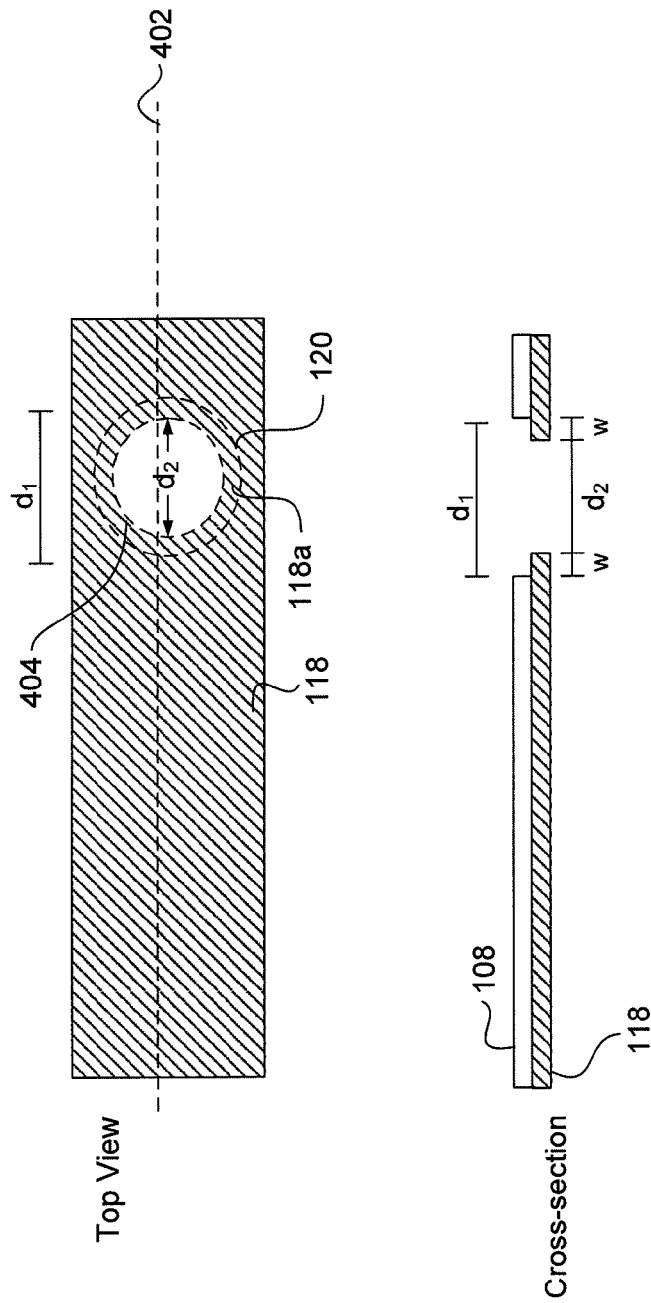

FIG. 4D depicts the insulation layer 118 overlaid on the lid 108 without the feed-through assembly 110. This figure is for illustrative purposes only and does not necessarily depict battery assembly 100 as it would be during any point of its manufacture. As can be seen, the diameter $d_1$ of the aperture 120 of the lid 108 is greater than the diameter $d_2$ of an aperture 404 of the insulation layer 118. This has the effect of creating an overlap region 118*a* with a width w that can engage with the feed-through assembly 110 when the insulation layer 118 is disposed over the lid 108, as is depicted in FIG. 4C. According to various embodiments, the diameter $d_1$ of the aperture 120 of the lid 108 may be 8-12% larger than the diameter $d_2$ of the aperture 404.

Figure 5:
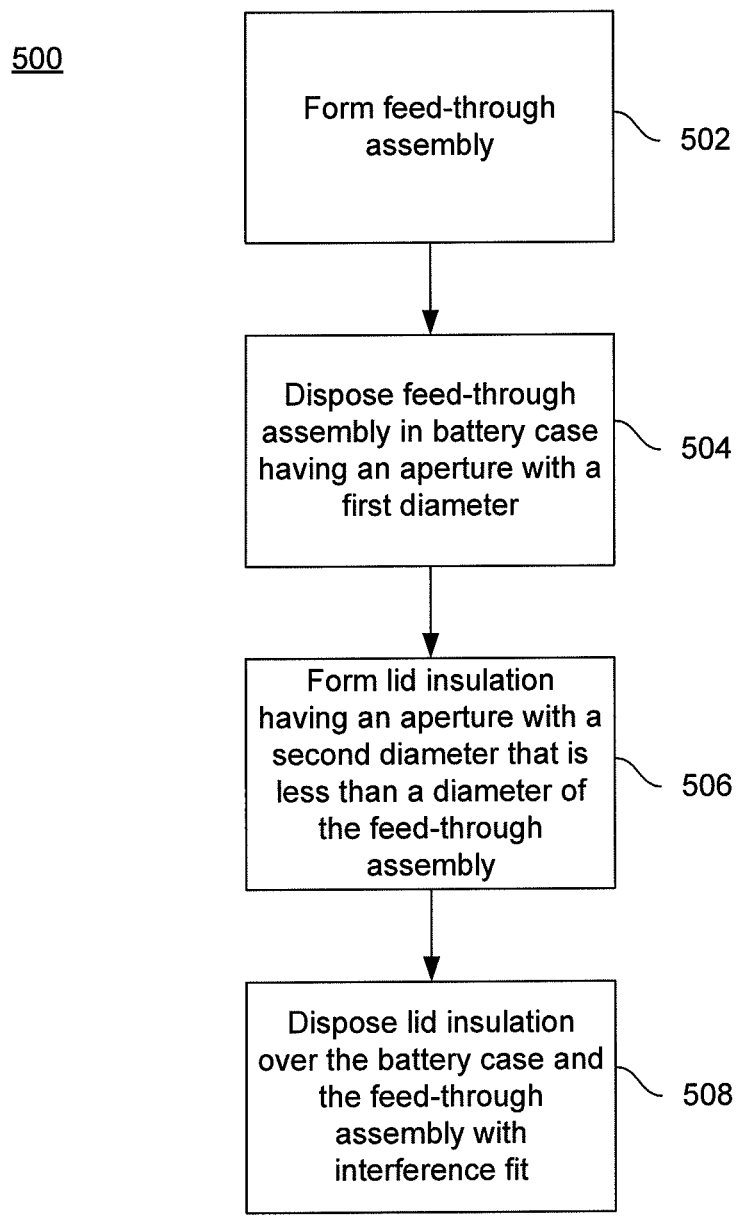
FIG. 5 is a flowchart depicting a method of manufacturing a battery assembly according to an embodiment of the disclosure.

FIG. 5 is a flowchart illustrating a method 500 of assembling a battery assembly according to various embodiments of the invention. For clarity, the method 500 is described with reference to FIGS. 1-4D, however it should be understood that the method is more broadly applicable and not limited to those embodiments.

As shown, the feed-through assembly 110 can be formed in step 502. At step 504, the feed-through assembly 110 can be disposed in aperture 120 of case 102. For example, the feed-through assembly 110 could be disposed in the aperture 120 of lid 108.

At step 506 an insulation layer 118 having an aperture 404 is formed (e.g., vacuum-formed) onto lid 108. As described above, the diameter $d_2$ of the aperture 404 of insulation layer 118 is smaller than the feed-through assembly with the feed-through insulation disposed thereon. At step 508, the insulation layer 118 is disposed over the inner surface of the case (e.g., the lid 108) and the feed-through assembly 110. This may be accomplished through a variety of methods. For example, according to some embodiments, the insulation layer is disposed using a vacuum forming process. Since there is an interference fit between insulation layer 118 and the feed-through assembly 110, the overlap region flexes and a portion engages with the feed-through insulator 116.

While the invention has been described in the environment of a battery for use in an IMD such as an ICD, a person skilled in the relevant art will understand that the invention may be used with other batteries. A person skilled in the relevant art will further understand that the invention described herein may also be applied to the manufacture of other electrical or electronic devices, such as capacitors, where it is desired to electrically insulate components in a corrosive environment.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. An electrical component comprising:
   a case having a first aperture formed therein;
   a feed-through assembly disposed in the first aperture and including a feed-through with a first insulation layer disposed thereon; and
   a second insulation layer disposed directly on an inner surface of the case and having a second aperture aligned with the first aperture, wherein the second aperture has a diameter smaller than a diameter of the feed-through assembly such that the second insulation layer forms a compression joint with the feed-through assembly.

2. The electrical component of claim 1, wherein the second insulation layer comprises an overlap portion, wherein the overlap portion of the second insulation layer is flexed and engaged with the feed-through assembly so that the second insulation layer forms a continuous seal around the periphery of the feed-through assembly.

3. The electrical component of claim 1, wherein the case comprises a lid, wherein the first aperture is formed in the lid, and wherein the second insulation layer is disposed directly on the lid.

4. The electrical component of claim 3, wherein the electrical component is a battery.

5. The electrical component of claim 4, wherein the diameter of the second aperture is 8-12% smaller than the diameter of the feed-through assembly.

6. The electrical component of claim 4, wherein the first insulation layer is injection-molded on the feed-through, and wherein the second insulation layer is vacuum formed directly on the lid.

7. The electrical component of claim 4, wherein the first insulation layer comprises polypropylene.

8. The electrical component of claim 7, wherein the second insulation layer comprises at least one of ethylene tetrafluoroethylene (ETFE) and polyether ether ketone (PEEK).

9. The electrical component of claim 4, wherein the feed-through assembly comprises an anode electrically connected to the lid, and a cathode electrically insulated from the lid.

10. The electrical component of claim 9, wherein the feed-through is disposed in the first aperture using a press fit.

11. A method of manufacturing an electrical component, comprising:
disposing a first insulation layer on a feed-through to form a feed-through assembly;
fixing the feed-through assembly in a first aperture formed in a case of the electrical component; and
disposing a second insulation layer over the feed-through assembly and directly on an inner surface of the case, wherein the second insulation layer comprises a second aperture that has a diameter smaller than a diameter of the feed-through assembly such that the second insulation layer forms a compression joint with the feed-through assembly.

12. The method of claim 1, wherein the second insulation layer comprises an overlap portion, wherein disposing the second insulation layer over the feed-through assembly and directly on the inner surface of the case comprises disposing the overlap portion of the second insulation layer over the feed-through assembly and directly on the inner surface of the case so that the overlap portion of the second insulation layer flexes and engages the feed-through assembly so that the second insulation layer forms a continuous seal around the periphery of the feed-through assembly.

13. The method of claim 11, wherein the case comprises a lid, wherein the first aperture is formed in the lid, wherein fixing the feed-through assembly in the first aperture formed in the case of the electrical component comprises fixing the feed-through assembly in the first aperture formed in the lid, and wherein disposing the second insulation layer over the feed-through assembly and directly on the inner surface of the case comprises disposing the second insulation layer over the feed-through assembly and directly on the inner surface of the lid.

14. The method of claim 13, wherein the electrical component is a battery.

15. The method of claim 14, wherein the diameter of the second aperture is 8-12% smaller than the diameter of the feed-through.

16. The method of claim 14, wherein the first insulation layer comprises polypropylene, and wherein the second insulation layer comprises at least one of ethylene tetrafluoroethylene (ETFE) and polyether ether ketone (PEEK).

17. The method of claim 14,
wherein disposing the first insulation layer on the feed-through to form a feed-through assembly comprises injection molding the first insulation layer on the feed-through; and
wherein disposing the second insulation layer directly on the inner surface of the lid comprises vacuum forming the second insulation layer directly on the lid.

18. A battery comprising:
a case forming an internal compartment and having an opening to provide access to the internal compartment;
a lid configured to mate with the case to close the opening, the lid having an inward-facing side, and having a first aperture formed therein;
a feed-through assembly disposed in the first aperture and including a feed-through with a first insulation layer disposed thereon; and
a second insulation layer disposed directly on the inward-facing side of the lid and having a second aperture aligned with the first aperture, wherein the second aperture has a diameter smaller than a diameter of the feed-through assembly such that the second insulation layer forms a compression joint with the first insulation layer disposed on the feed-through.

19. The battery of claim 18, wherein the first insulation layer comprises polypropylene and the second insulation layer comprises at least one of ethylene tetrafluoroethylene (ETFE) and polyether ether ketone (PEEK).

20. The battery of claim 19, wherein the first insulation layer is injection-molded on the feed-through, and wherein the second insulation layer is vacuum formed directly on the lid.

* * * * *